United States Patent [19]

Johnson

[11] 4,263,972

[45] Apr. 28, 1981

[54] AGRICULTURAL STAKE PULLER

[76] Inventor: Reaves H. Johnson, Rte. 1, Box 75, Smithville, Ga. 31787

[21] Appl. No.: 82,100

[22] Filed: Oct. 5, 1979

[51] Int. Cl.³ .................... A01D 57/00; A01D 57/20
[52] U.S. Cl. ........................................ 171/61; 171/38
[58] Field of Search .................................. 171/61, 38

[56] References Cited

U.S. PATENT DOCUMENTS

| | | | |
|---|---|---|---|
| 1,472,959 | 11/1923 | Byrne et al. | 171/61 |
| 2,297,065 | 9/1942 | McLendon | 171/61 |
| 2,476,336 | 7/1949 | Urschel | 171/61 |
| 2,590,758 | 3/1952 | Dahlman | 171/61 |
| 2,833,357 | 5/1958 | Lust | 171/61 |
| 3,586,108 | 6/1971 | Wedgeworth et al. | 171/61 |
| 3,693,721 | 9/1972 | Arnold et al. | 171/61 |
| 3,989,110 | 11/1976 | Medlock et al. | 171/61 |

FOREIGN PATENT DOCUMENTS

| | | | |
|---|---|---|---|
| 247679 | 5/1968 | U.S.S.R. | 171/61 |
| 211921 | 11/1968 | U.S.S.R. | 171/61 |
| 259524 | 11/1969 | U.S.S.R. | 171/61 |

Primary Examiner—Paul J. Hirsch
Attorney, Agent, or Firm—Macdonald J. Wiggins

[57] ABSTRACT

Apparatus for moving along rows of agricultural beds for pulling and collecting stakes therefrom. A stake-pulling element is suspended from framework attached to a wheeled collection bin and from a framework attached to a towing vehicle. A pair of endless parallel puller chains is disposed in the stake pulling element having a forward end near the surface of the bed and a rearward end elevated with respect thereto. The puller chains are driven to cause the inner runs of the chains to move upward and rearward with the rearward chain velocity equal to the forward velocity of the apparatus. Stakes are gripped between the chains, carried rearwardly and pulled directly upward to remove the stakes from the ground. As the stakes are carried to the rear of the chains, they are transferred to a stake transport belt which moves the pulled stakes to the bin and deposits the stakes therein. Operating power in one embodiment is obtained by coupling to the wheels of the collection bin. A propane burner is mounted ahead of the stake-pulling element for burning and clearing of strings and plants from the stakes before pulling.

17 Claims, 9 Drawing Figures

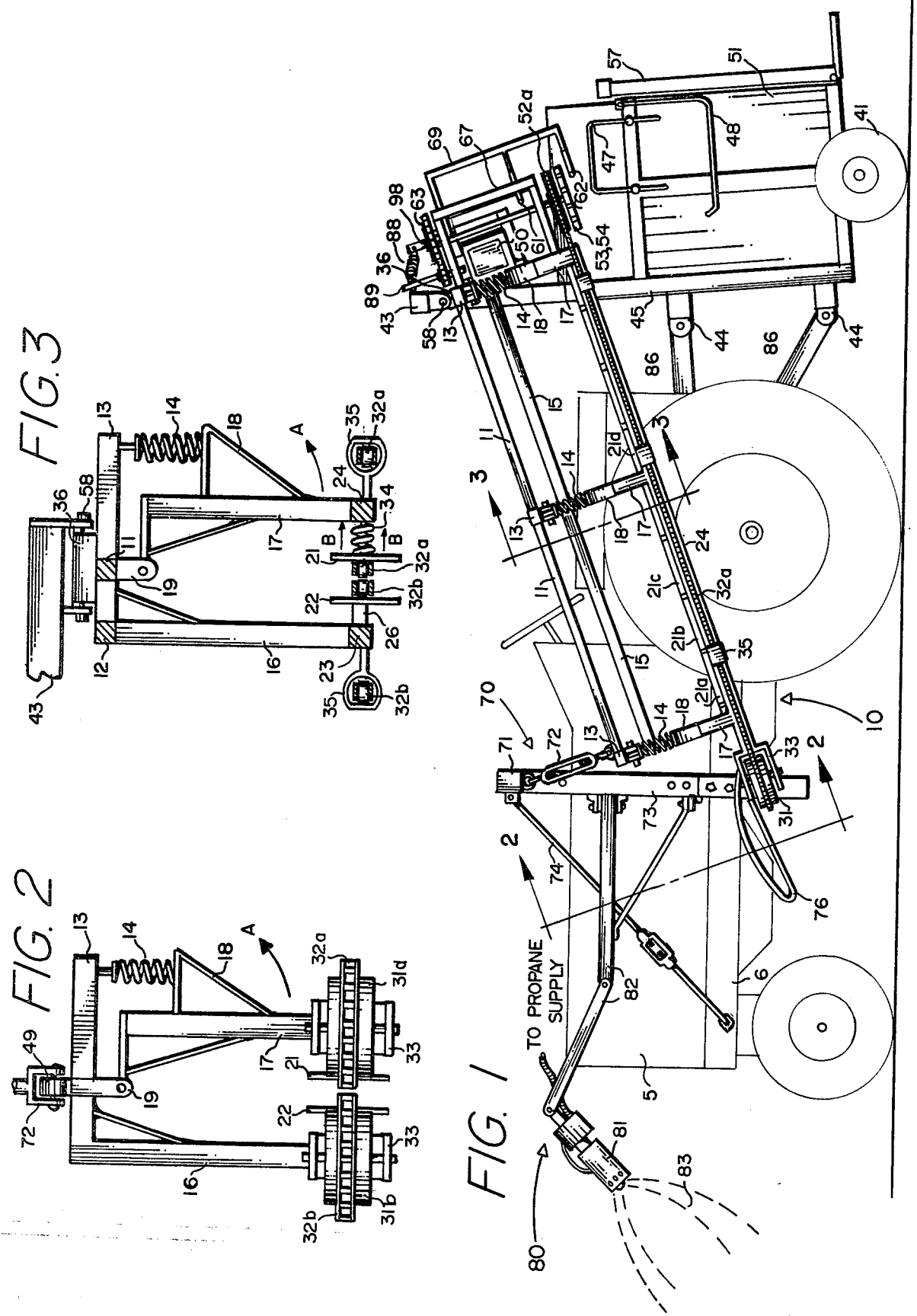

AGRICULTURAL STAKE PULLER

BACKGROUND OF THE INVENTION

1. Field of the Invention

The present invention relates to apparatus for pulling stakes used in agriculture, and more particularly for removing stakes and strings used in growing tomatoes and the like over plastic mulch covered beds.

2. Description of the Prior Art

A variety of produce is grown in the field utilizing rows of wood stakes which may support strings or lines upon which the plants can grow. Tomato crops are typical of produce grown in this fashion. Where tomatoes are to be mechanically harvested, stakes are generally not necessary; however, where picking of tomatoes by hand is desired, stakes and strings are necessary to keep the vines off the ground to provide ready access to the fruit during picking. An important instance where stakes are required is the growing of tomatoes over plastic mulch covered beds. Over the past fifteen years, the technique of growing tomatoes and other plants on plastic mulch covered beds has been developed. Although the method is particularly effective for use in sandy soil, it is proven to have many other advantages: cleanliness of the fruit; good control of weeds; improved action of soil fumigants; reduction of root rot; reduction of soil moisture evaporation; prevention of soil erosion; and protection against freeze damage. The plastic mulch method is becoming more widely used; for example, during the 1976-77 season in Florida, over 75% of the 35,000 acres of fresh market tomatoes produced in that state were grown in plastic mulch covered beds. Planting is through holes punched or burned in the plastic film. It is also common to include drip irrigation tubing along the bed underneath the plastic mulch for watering and fertilizing of the bed. This system for growing tomatoes has proven to be more energy efficient per unit of product than the traditional system of growing the plants on bare ground, thus, the technique may be expected to become more widespread throughout the United States.

Available mechanical harvesters have proved unsatisfactory for operation over plastic mulch beds. The plastic film becomes torn and shredded, causing clogging of conveyor belts, separators and other moving parts of the machinery, and the irrigation tubing is usually damaged. For this reason, tomatoes and other produce grown on plastic mulch must be harvested manually. Therefore, wood stakes and plastic monofilament lines are required for ease of hand picking when tomatoes and similar plants are grown over plastic mulch covered beds. After harvesting of the crop and prior to planting of the next crop, it is necessary to remove the stakes and the lines. The removed stakes are collected and stored for reuse for crops. It is present practice to utilize hand labor to pull each stake, transport the stakes to a collection point along a row, and to have trucks later drive through the fields collecting the stakes and returning them to the storage point. As may be recognized, the cost of such hand labor, and the time involved is significant. For example, in Florida the total cost of removing stakes from a typical field is about $50 per acre. Additionally, such field workers tend to be careless, and breakage and loss of stakes is quite common. As may be recognized, the bill for stake removal of stakes from the plastic mulch grown tomatoes in Florida for only one crop will approach two million dollars. This cost is, of course, passed along to the consumer in the cost of the produce.

No positive or effective machines are known that can mechanically remove the lines and pull and collect the stakes from agricultural fields. Thus, such apparatus is needed to reduce this phase of cost of raising agricultural crops.

SUMMARY OF THE INVENTION

My invention provides apparatus to be attached to a tractor or the like which moves along agricultural rows and removes lines from the wood stakes, grasps the upper ends of the stakes, cleanly pulls each stake directly upward without damage to the plastic mulch, transports the stake to a receiving bins and deposits the stakes therein. I have found that my apparatus can remove stakes from approximately twenty acres per eight hour day, at a total cost for labor and tractor of approximately $5 to $6 per acre.

No damage is done to the stakes and almost 100% reuse is possible. In addition, the freedom of damage to the plastic mulch will permit replanting of other crops in the same mulch to take advantage of the remaining nutrients in the beds.

My invention consists of four main elements; a string removing burner element; a stake pulling element; a stake transport element; and a stake collecting bin. Although my invention can be implemented in a variety of ways, one version is provided that may be attached to and pulled by a conventional, small farm tractor. In this version, a large receptacle or bin is provided on a two wheel trailer base having a pair of wheels with a width sufficient to straddle the crop bed. Plastic mulch beds are conventionally arrayed in rows having furrows therebetween with the plastic disposed over the slightly raised beds. Thus, the trailer base is adapted to have its wheels operating in the furrows between the beds. An upright frame projecting, for example, eight feet above the ground is disposed in front of the bin and trailer. A cantilevered arm extends from the top of the framework laterally over the adjacent bed. The front of the upright frame is provided with three-point hitch attachments for connection to the tractor hitch. A forward extending stake-puller frame-work is pivotally suspended from the cantilevered arm such that the forward end of the frame may be moved up or down vertically. A second cantilevered arm is attached to the forward end of the tractor and projects over the adjacent row and the forward end of the chain supporting framework. An adjustable turnbuckle suspends from the distal end of this cantilevered arm and supports the forward end of the stake puller framework. In operation, the forward end of the puller supporting framework is maintained lower than the rear end with the framework and puller chains forming an angle with the ground which may be on the order of 15° to 20° as determined by the length of the stakes. This angle is readily adjusted by the supporting turnbuckle.

Along the lower portion of the puller framework, a pair of endless puller chains is disposed with each chain supported by a fore and aft sprocket assembly. The plane of the chains is horizontal with the inner portions parallel to each other. Each chain is driven by a rear sprocket in opposite directions of rotation such that the inner parallel lengths of the two chains are both moving together rearwardly. The rear sprockets of the puller chains are driven via a gear box and drive shaft coupled to one wheel of the trailer bed. Thus, as the stake receiving bin and trailer bed are pulled along the rows by the tractor, the puller sprockets are driven at a rotational speed directly proportional to the tractor speed. As will be described below, during movement of the apparatus along a bed, a stake is caught between the puller chains at the forward end of the chains, carried rearwardly and pulled upward to remove from the ground by virtue of the angle of the chains with respect to the ground. As the stake reaches the rear end of the puller chains, it is transferred to a lateral stake transport belt which carries the stake toward the collecting bin. Guide bars catch the lower end of the stake causing it to swing from its vertical position toward a horizontal position and to be pulled over and dropped into the receiving receptacle.

An adjustable arm is provided at the forward end of the chain supporting framework for mounting a propane burner. The purpose of the burner is to remove the plastic lines from the stakes before pulling as will be described below.

To start a pulling operation in the field, the tractor and trailer unit are driven along the first dummy row (normally provided) with the stake puller framework essentially centered over the first row having stakes. In a typical field, the stakes may be projecting above the ground about 36" and about two to three feet apart. The strings tied between the stakes are normally monofilament plastic fish line. The picked plants may be hanging, in many cases, from the strings. The propane burner projecting from the stake puller framework is adjusted to cause its flame to impinge on the next stake to be pulled with sufficient flame volume to cover the monofilament lines. Since the monofilament lines flash at a relatively low temperature, the flame will quickly disintegrate the line forward of the apparatus as the tractor moves along the row. Disintegration of the lines will also cause any plants hanging therefrom to fall on the surface of the bed and therefore prevent any tangling of plants or lines in the stake puller. The stake immediately in front of the puller sprocket will be free from plants and lines and, as the tractor moves forward, will be guided by guide bars into the counter-rotating sprockets. The sprocket mounting portions of the framework are spring loaded so that as the stake moves between the sprockets, the sprocket can move sufficiently to allow the two parallel chains to catch, grip, and carry the stake rearward. Due to the slope of the chains, as the tractor moves forward, the stake is pulled vertically by the chains. By synchronizing the forward speed of the tractor to exactly match the rearward speed of the chains, there will only be a vertical force component on the stakes since they will be being carried backward at exactly the same rate as the framework is moving forward. The height of the rear portion of the puller is such that the bottoms of the stakes will be pulled completely clear of the ground. As the stake reaches the two rear sprockets, it will be released from the pulling chains. A transverse conveyor is provided, which may be an endless V-belt having a series of cleats attached to its outer edge with spring loaded guide bars parallel to the transport side of the belt. The belt drive pulley is positioned essentially concentric with the puller chain drive sprocket such that the cleats on the belt and the guide bars grasp the stake just prior to its release from the puller chains. The drive belt then carries the stake laterally toward the collection bin. At the edge of the collection bin and about two feet below the conveyor belt, a guide bar is mounted transverse to the belt conveyor. As the conveyor moves the vertical stake horizontally in the direction of the collector bin, the lower end of the stake will contact the transverse guide bar. Continued movement of the stake will therefore cause the lower end of the stake to be forced upward rotating about the top end of the stake where it is grasped by the conveyor belt. The stake is thus dragged over the transverse guide bar, assuming a somewhat horizontal position with the result that, as the upper end of the stake leaves the conveyor, the stake will fall horizontally into the collection bin. The collection bin may be sized to accomodate one or more rows of stakes and include provisions for dumping stakes at the end of each row for subsequent collection or for tying in bundles in the bin. Adjustment means are provided to allow adjustment of my stake puller for various lengths of stakes and various separations of stakes. As may be recognized, no skill is required on the part of the operator as it is only necessary for the operator to maintain an approximate alignment of the puller chains with the center of the row and to insure that the burner is properly clearing the lines and vines ahead of the puller. The limit on the speed of operation is only that necessary to maintain traction for the drive system and proper clearing of the lines and vines ahead of the stake puller.

Thus, it is a principle object of the invention to provide apparatus for pulling stakes from agricultural beds without damage to the beds or the stakes.

It is another object to the invention to provide a stake puller which applies only a vertical component of force to the stakes while pulling.

It is yet another object of the invention to provide a stake puller having means for collecting and temporarily storing the stakes during the pulling operation.

It is still another object of the invention to provide a stake puller having a longitudinal pulling chain assembly and a lateral conveyor for carrying the stakes from the puller to the collection receptacle.

It is a further object of the invention to provide a stake puller in which the stake conveyor moves the stakes to an approximate horizontal position before collection to provide ease of storage and bundling.

It is still a further object of the invention to provide a stake puller which can greatly reduce the cost per acre of removing stakes from plastic mulch covered beds, and which does not damage the plastic mulch.

These and other objects and advantages of the invention will be apparent from the following detailed description when read in conjunction with the attached drawings.

BRIEF DESCRIPTION OF THE DRAWINGS

FIG. 1 is a left side view of my agricultural stake puller shown attached to a tractor;

FIG. 2 is a front view of the stake pulling assembly of my invention as viewed in the plane 2—2 of FIG. 1;

FIG. 3 is a cross-sectional view of the stake pulling assembly in the sectional plane 3—3 of FIG. 1;

DETAILED DESCRIPTION OF THE PREFERRED EMBODIMENT

Figure 4:
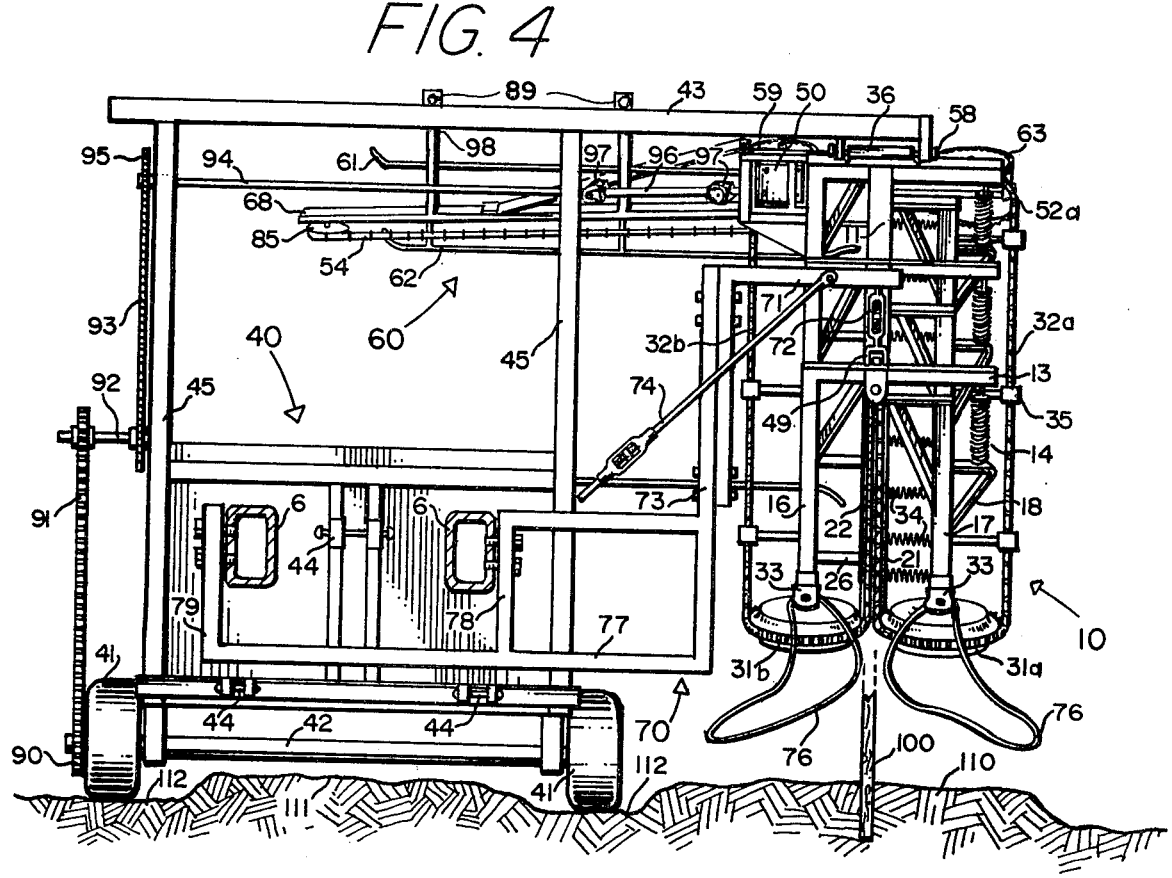
FIG. 4 is a front view of my agricultural stake puller in position for pulling stakes from the right hand bed with the tractor operating over the left hand bed, with only the side rails of the tractor shown in cross-section for clarity.
Figure 5:
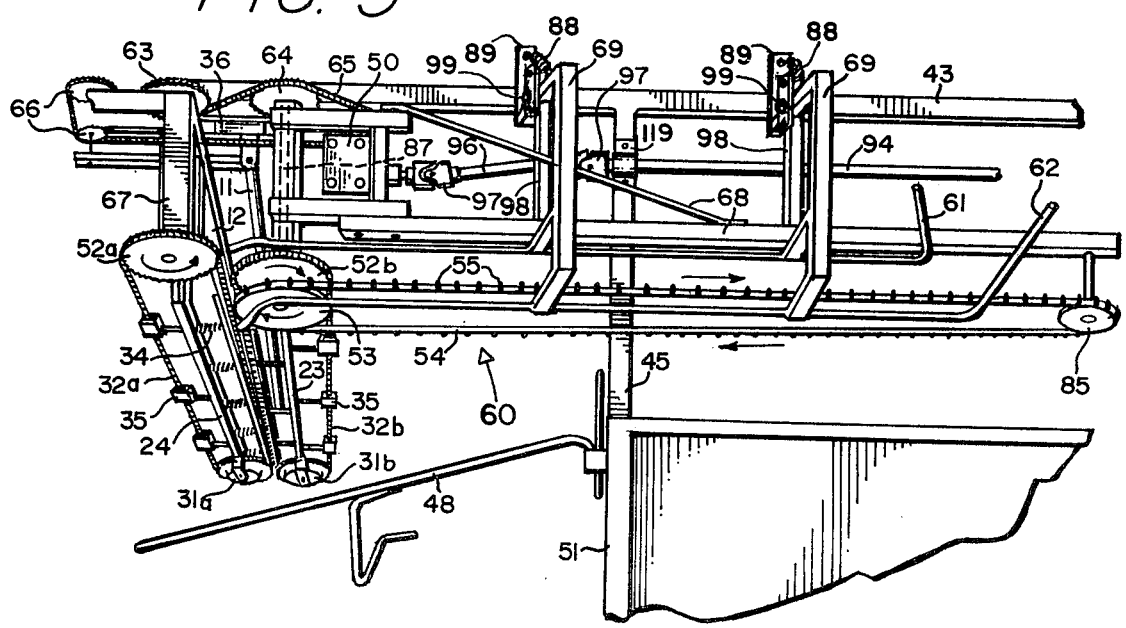
FIG. 5 is a rear view of the stake puller assembly of my invention shown attached to the stake bin with the stake bin indicated in partial view.

A preferred embodiment of my agricultural stake puller will be described with reference to FIGS. 1 through 5. FIG. 1 is a side view of the preferred embodiment shown attached to a tractor 5 in general position for operation. Seen generally in this view are: stake pulling assembly 10; stake collecting bin 40; and string or line removing burner assembly 80. Stake pulling assembly 10, seen in side view in FIG. 1, utilizes a set of three transverse frame elements best seen in FIGS. 2 and 3, with the element of FIG. 2 at the forward end, the element of FIG. 3 in the center and a third similar element at the rear. Each element includes a left upright post 16 and a top transverse arm 13. The set of posts and arms is connected longitudinally by lower right longitudinal brace 23, upper right longitudinal brace 12 and central longitudinal brace 11. The forward element is supported by front pivot 49 at the center of arm 13 and the rear element by rear pivot 36 as will be described in more detail below. Left upright posts 17 are pivotally attached to arms 13 by yokes 19, as seen in FIGS. 2 and 3. The lower ends of left posts 17 are connected longitudinally by lower left longitudinal brace 24. The forward ends of longitudinal braces 23 and 24 each support sprocket yokes 33 in which front pulling chain sprockets 31 are mounted. At the rear of stake pulling assembly 10, pulling chain drive sprockets 52 are mounted in framework 67 as best seen in FIG. 5. An endless puller and conveyor chain 32a is connected between left front puller chain sprocket 31a and left rear puller chain drive sprocket 52a, and endless puller and conveyor chain 32b is connected between right sprockets 31b and 52b. The spacing and positions of the sprockets are selected to cause the inner runs of the two chains 32a and 32b to be parallel for the length of the frame as seen in the various views. Referring to FIGS. 2 and 3, it may be noted that spring 14 bearing on the spring bracket 18 is disposed between arm 13 and bracket 18. The three left frame uprights 17 are interconnected by left lower longitudinal brace 24 allowing the pivoted assembly to swing outward as a unit and to be forced inward by springs 14, forcing sprockets 31a and 31b together and sprockets 52a and 52b together. Chain guide plates 22 and 21 run the length of the frame assembly with pressure plate 22 being fixed and supported from right longitudinal brace 23 by posts 26, as seen in FIG. 3 and FIG. 4. Left pressure plate 21 is segmented into a plurality of sections, shown for example, 21a, 21b, 21c, and 21d, in FIG. 1. Each segment of left pressure plate 21 is supported by spring 34 attached to left horizontal brace 24 such that springs 34 and pressure plates 21 maintain chains 32a and 32b in contact with each other against fixed pressure plate 22. The purpose and action of springs 14 and springs 34 will be discussed in more detail below.

Stake pulling assembly 10 is mounted to tractor 5 by a forward support framework 70 seen in FIG. 1 and FIG. 4. As may be noted in FIG. 4, forward supporting framework 70 is comprised of left and right tractor attachment bars 78 and 79 shown connected to tractor chassis 6 in partial cross-sectional view, lower cross bar 77, vertical support 73, and cantilever arm 71. A forward cross brace 74 connects cantilever arm 71 to the front portion of tractor chassis 6 as best seen in FIG. 1. Cantilever arm 71 is used to support the forward end of stake pulling assembly 10 utilizing turnbuckle 72 connected between forward pivot 49 and cantilever arm 71. Upright post 73 is advantageously split and may be adjusted vertically to suit a particular tractor, and turnbuckle 72 may be adjusted to set the height of sprockets 31 from the ground. The rear end of stake pulling assembly 10 is supported by rear cantilever arm 43 which is a portion of stake collecting bin assembly 40. Bin assembly 40 consists of a rectangular bin 51 having inside dimensions sufficient for collection of the stakes to be pulled. Bin 51 includes a set of wheels 41 rigidly connected to axle 42. The spacing of wheels 41 is selected to match spacing of furrows 112 between beds 110 and 111. The framework for bin 51 includes upright posts 45 which support rear cantilever arm 43 and three point tractor couplings 44 for connection to a pulling tractor 5. The front view of the stake pulling apparatus of my invention shown in FIG. 4 has the pulling tractor omitted for clarity, and is illustrated in position for pulling stakes from bed 110. Accordingly, bed 111 may be the first row in a field having no stakes, or a bed in which the stakes have been previously pulled. Thus, bin assembly 40 is pulled along by tractor 5 and over bed 111 in furrows 112 while stake pulling assembly 10 is suspended over the adjacent bed 110 on the left and aligned such that stakes 100 will contact the inner portions of sprockets 31. Guide rods 76 serve to steer misaligned stakes into the sprockets.

As bin assembly 40 is pulled by tractor 5, sprocket 90 attached to axle 42 will rotate and serves to furnish the driving power for the operation of my agricultural stake puller. One portion of the drive train is mounted to bin assembly 40 and a second portion is supported by the framework 67 of stake pulling assembly 10. As shown in FIG. 4, the first portion includes a drive shaft 94 supported by upright posts 45 and driven by sprocket 95 via chain 93, reduction sprockets 92, drive chain 91 and sprocket 90. As best seen in FIG. 5, drive shaft 94 turns in pillow block 119 and is coupled by means of universal joints 97 and shaft 96 to gear box 50 which is mounted on rear frame 67. Thus, stake pulling assembly 10 may move about its supporting pivot point 36 without affecting the drive train. Gear box 50 is coupled by chain 65 via drive sprocket 59, (not shown in FIG. 5) to sprockets 63 and 64, utilizing idler sprockets 66. Sprocket 64 serves to drive right pulling chain 32b via its rear drive sprocket 52b, and sprocket 63 drives left pulling chain 32a by its rear sprocket 52a. As may be noted, chain 65 is routed such that sprockets 64 and 63 rotate in opposite directions causing the two front pulling chain sprockets 31 to each rotate inwardly as will be described more fully below.

FIGS. 4 and 5 also disclose details of the stake transport assembly shown generally at 60 which serves to carry pulled stakes from the pulling assembly 10 and to deposit such stakes in bin 51. Stake transport support arm assembly 68 projects transversely from frame 67 and supports V-pulley 85 at its distal end. Grooved V-pulley 53 is driven from driving shaft 87 for right pulling chain rear drive sprocket 52b with endless stake conveyor V-belt 54 connected between V-pulleys 53 and 85. V-belt 54 includes a series of projections or cleats 55 along its outer edge. Two guide bars 61, 62 are supported by guide spring arms 69 attached by pivots 99 to transport support arm uprights 98. Spring arms 69 are biased by springs 88 connected between uprights 98 and arms 89 toward the surface of stake conveyor belt 54 such that a stake may be gripped between belt 54 and guide bars 61 and 62. Additional guide bars 47 and 48 are attached to the left side of bin 51 for guiding pulled stakes into bin 51 as described below.

For pulling of stakes in beds in which monofilament plastic lines or strings have been used to support growing plants, it is first necessary to remove the lines and any plants attached thereto to prevent tangling. Referring to FIG. 1, a line removing burner assembly 80 for this purpose is shown. Although any convenient mounting arrangment may be used, the preferred embodiment utilizes adjustable brackets 82 pivotally attached to upright post 73 to support a propane burner 81 or the like. Arm 82 may be swung laterally in an arc in order to position burner 81 along the line of stakes. Similarly, the articulated construction of arm 82 permits the burner 81 to be raised, lowered, and aimed as necessary to remove the lines. In operation, a propane bottle may be installed on tractor 5 and controlled by the driver. A broad flame 83 is produced which is effective in melting and vaporizing monofilament type lines from the stakes.

Figure 6:
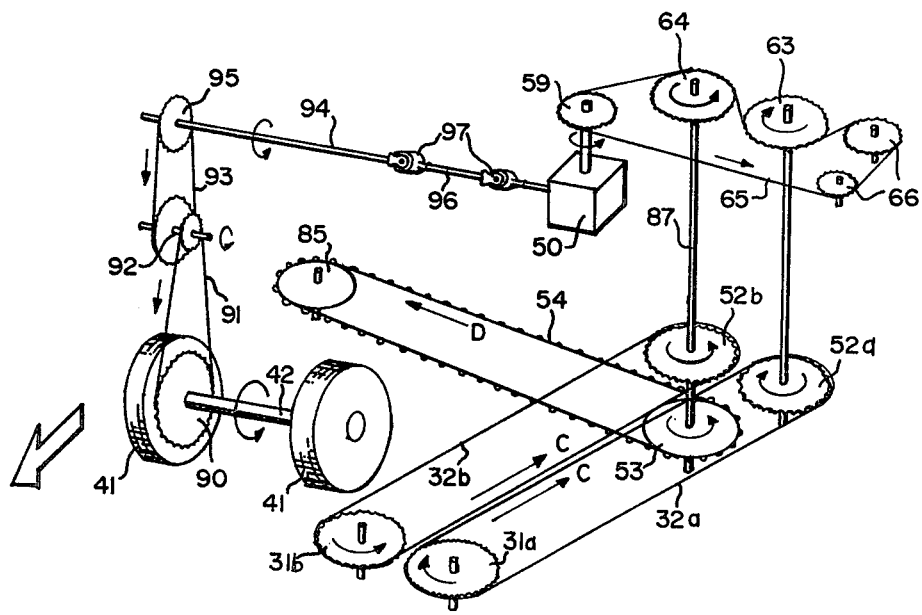
FIG. 6 is a schematic view of the moving elements of my agricultural stake puller showing the manner of driving the elements from the wheel and axle assembly of the bin.

Having hereinabove described the constructional details of my agricultural stake puller, the operation of the invention will now be explained with reference to the schematic diagrams shown in FIGS. 6 and 7. FIG. 6 illustrates schematically the drive train and drive system of the stake pulling apparatus in simplified form. Assuming that the stake pulling apparatus is being towed by a tractor 5, (as in FIG. 1) wheels 41 and axle 42 will rotate in the direction indicated by the arrow. Sprocket 90 therefore drives fixed drive shaft 94 via sprockets 92, 95 and chains 92, 93 with the respective directions indicated by arrows. Gear box 50 is driven via the universal joint section formed from joints 97 and intermediate shaft 96. Sprocket 59, driven by gear box 50, serves to operate pulling chain drive sprockets 64 and 63 which rotate in opposite directions as indicated by the arrows. Next pulling chains 32a and 32b are driven by their respective rear driving sprockets 52a, 52b in the directions indicated by the arrows, resulting in the inside chain runs both moving rearwardly as shown by arrows C. Right shaft 87, which drives rear drive sprocket 52, also drives pulley 53 causing endless belt 54 to move in the direction indicated by arrow D.

Figure 7:
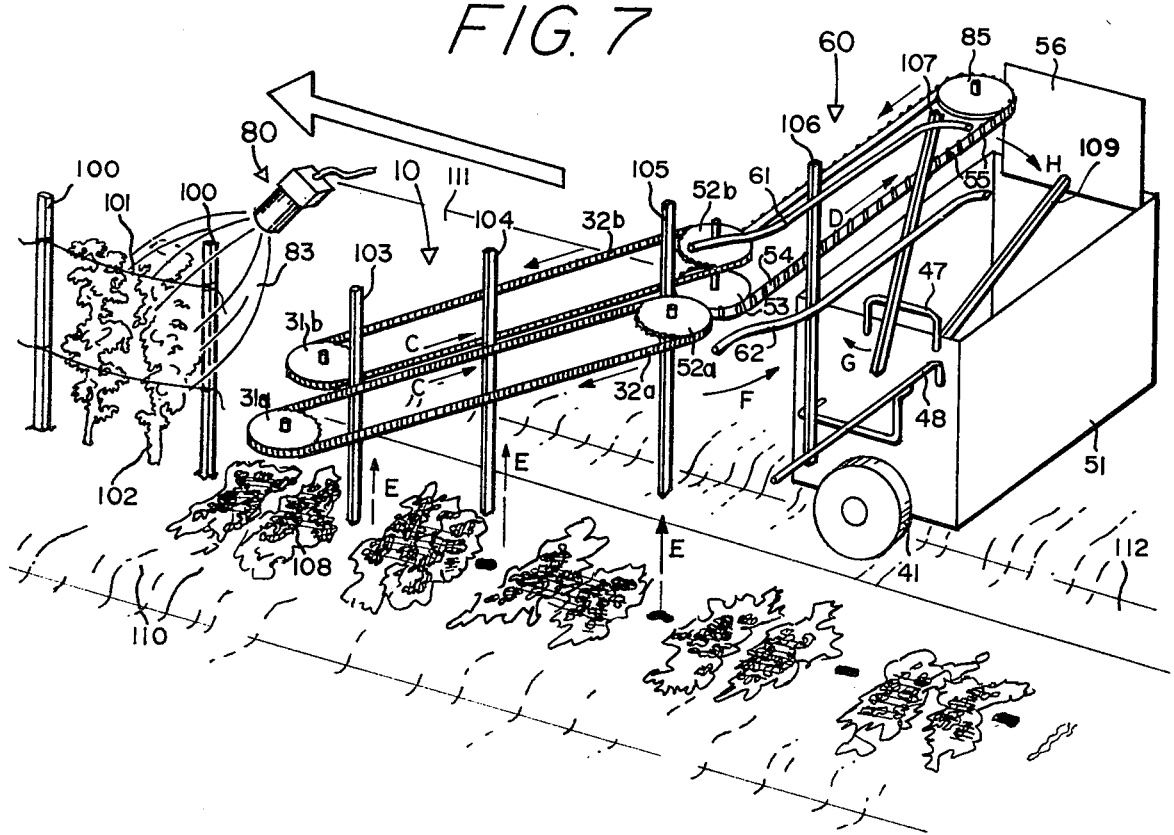
FIG. 7 is a perspective greatly simplified schematic view of the operating portions of my agricultural stake puller with all of the supporting structure and the pulling tractor omitted to illustrate the functional operation of the invention.

FIG. 7 is a simplified and functional diagram of the basic operative parts of the stake pulling apparatus of the invention with the frameworks, drive system, and other elements omitted for clarity. Illustrated are two rows or beds with row 111 having no stakes, such as the first row of a field or a row from which the stakes have previously been pulled. Thus, the tractor (not shown) will pull bin 51 down row 111 in the direction of the solid arrow with wheels 41 serving to operate the stake puller assembly 10 and the stake transport assembly 60 as explained with reference to FIG. 6. Shown in FIG. 7 are stakes 100 with a typical installation of monofilament lines 101 tied therebetween with plants such as tomato vines 102 attached thereto. Burner assembly 80, shown in a typical operating position, is positioned such that flame 83 will encompass lines 101. As the frame 103 impinges on the plastic monofilament line, the material quickly flashes and burns, dropping free of the stakes. As may be understood, the rate of movement of the puller along the bed prevents any damage to stakes 100 from flame 83. Thus, as the line is burned any plants attached thereto will drop to the surface of the bed 110 as shown at 108. In FIG. 7, stake 103 has been cleared of its lines 101 and is shown having just entered between the inner runs of chains 32a and 32b. The tractor driver will normally guide the apparatus such that the center line of the puller chains 32 are aligned with the row of stakes to be pulled. However, as previously mentioned, the guide rods 76 (shown in FIG. 4) serve to guide any misaligned stakes into the center of sprockets 31. As a stake touches the two sprockets and the chain, it will be forced rearward between the two sprockets 31a, 31b. To prevent damage to the stake, springs 14 advantageously allow left frame uprights 17 to pivot outward (as shown by arrows A in FIG. 2 and FIG. 3). The tension of springs 14 is selected to permit such movement without damage to the stakes. In FIG. 7, stake 103 has been grasped by sprockets 31 and has moved rearward free of the sprockets. Due to the normal slack in chains 32, springs 14 return sprockets 31 back to the closed position in readiness for catching the next succeeding stake. Chains 32a and 32b are held tightly together between movable guide segments 21 and fixed guide 22 by springs 34 (see FIG. 3). Consequently, when stake 103 moves clear of sprockets 101, it remains tightly gripped by this action. Guide plate 21 is segment as described with reference to FIG. 1 such that each stake is independently gripped. By virtue of the slope of puller chains 32, as the apparatus moves forward and stake 103 moves rearward with respect to the chains, a vertical pulling force indicated by arrow E is applied to stake 103. By properly selecting the ratio of the drive train sprockets, the rate of movement of chains 32, indicated by arrows C, is exactly matched to the rate of forward movement of the stake pulling apparatus; therefore, the point of contact of a stake with chains 32 remains stationary in the longitudinal direction and will have only a vertical component of motion, as shown by arrows E, and will therefore pull a stake straight upward without damage to the bed or to a plastic mulch covering the bed. In FIG. 7, stake 104 may be seen to have progressed approximately half the distance to the rear of chains 32 and has been pulled vertically, clear of bed 110. Similarly, stake 105 has reached rear sprockets 52a, 52b and has been raised completely clear of bed 102 and any plants or other debris on the bed. As may be noted at this point, the supporting frameworks for chain pulling assembly 10 and turnbuckle 72 shown in the previous figures may be selected and adjusted to suit the lengths of stakes to be pulled. It is only necessary that the height of the forward end of chains 32 be at least above the center of gravity of the stakes, and the rear end of chains 32 be high enough to insure complete removal of the stakes from the ground as indicated. As stake 105 reaches sprockets 52a, 52b, springs 14 again permit separation of the sprockets to pass stake 105 therethrough without damage. At this point, stake guide rods 61 and 62 will catch stake 105 and, by virtue of the spring loading force thereon, will hold stake 105 firmly against belt 54 riding in pulley 53. Cleats or projections 55 on the outer surface of belt 54 will contact stake 105, causing it to move in direction D along guide 61 and 62. As stake 105 leaves sprockets 52, as indicated by arrow F in FIG. 7, stake 106 has moved toward bin 51, carried by belt 54, as shown by arrow D. As stake 106 moves further laterally, its lower end will contact guide bar 48 and then, successively, guide bar 47. For example, stake 107 has been carried further along causing its lower end to contact bar 48 and to pivot upward as shown by arrow G. Next, the stake will be pulled over guide bar 47 and will leave guide bars 61, 62 dropping into bin 51 as indicated by arrow H for stake 109. A right guide plate 56 extends upward from the right side of bin 51 to catch the end of stake 109 for guiding into bin 51 if necessary.

As may now be recognized, movement of my agricultural stake pulling apparatus along a row of stakes will permit the stakes to be pulled vertically without danger of breaking or snapping or otherwise damaging the stakes, to then be carried laterally to a collecting bin, and to be dropped horizontally into the collecting bin.

Figure 8:
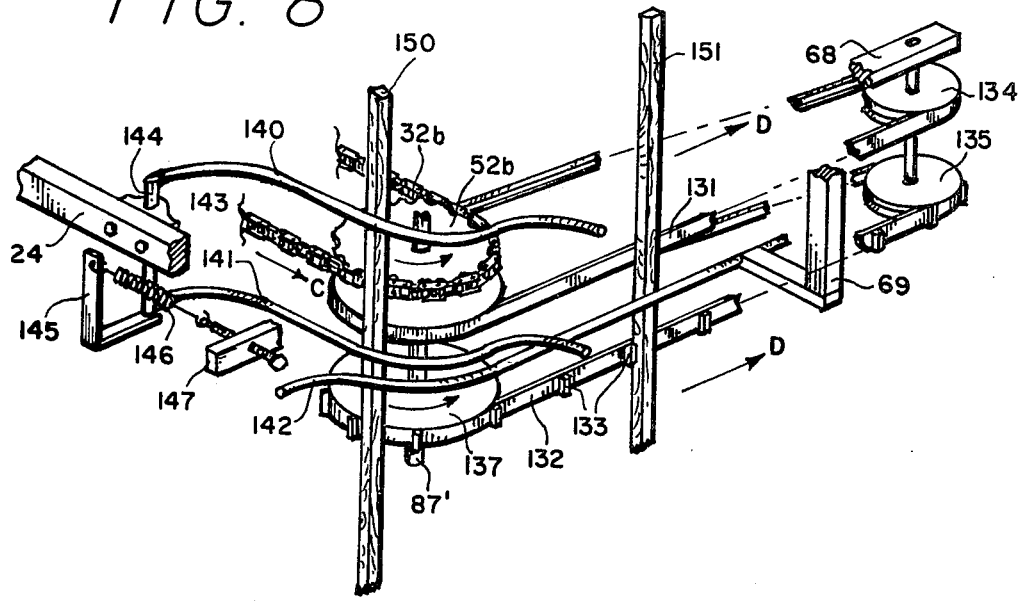
FIG. 8 is a partial view of an alternative version of the stake transport assembly having a double transport belt.

An alternative stake transport assembly for carrying pulled stakes from the pulling assembly 10 to bin 51 is shown in the perspective view of FIG. 8. This alternative assembly is particularly suitable for transporting long, heavy stakes. Right pulling chains 32b and right rear chain sprockets 52b are shown with left pulling chain 32a and left rear chain sprocket 52a omitted for clarity. Vertical sprocket drive shaft 87' also drives two V-pulleys 103 and 137. Upper pulley 130 drives stake guiding V-belt 131 riding in V-pulley 134 supported by support arm 68 (shown in partial view). Lower V-pulley 137 drives endless stake conveyor V-belt which has its outer end supported on V-pulley 135 on a common shaft with pulley 134. V-belt 132 is provided with projections or cleats 133 along its outer surfaces as previously described with respect to stake conveyor belt 54 as seen in FIG. 5. A pair of guide bars 140, 141 are attached to bar 144 which pivots in pillow block 143 attached to left longitudinal brace 24 and are spring biased by spring 146 connected between arm 145 and bracket 147, which connects to rear frame 67 (not shown).

As stake 150 is carried rearward by chains 32, as shown by arrow C, it contacts guide rods 140, 141 which force the stake against chain 32b and sprocket 52b. Rods 140, 141 curve around sprocket 32b and pulleys 130, 137. As stake 150 leaves chain 32a and sprocket 52a, guide rods 140 and 141 maintain stake 150 in contact with sprocket 32b and chain 32b as it makes contact with belts 131 and 132. A transport guide rod 142 is disposed approximately halfway vertically between guide belt 131 and conveyor belt 132, and is supported by spring arms 69 (with only one shown in the partial view). Spring arms 69 force guide rod 142 toward belts 131 and 132 such that as stake 150 moves around sprocket 52b, stake 150 is held firmly against belts 131 and 132. As a stake, such as stake 151, leaves sprocket 52b moving in the direction of arrows D, it is carried by conveyor belt 132 by virtue of cleats 133. As the lower end of stake 151 contacts rods 48 and 47 (see FIG. 7), the upper end may rotate along belt 131 and be guided into bin 51.

Figure 9:
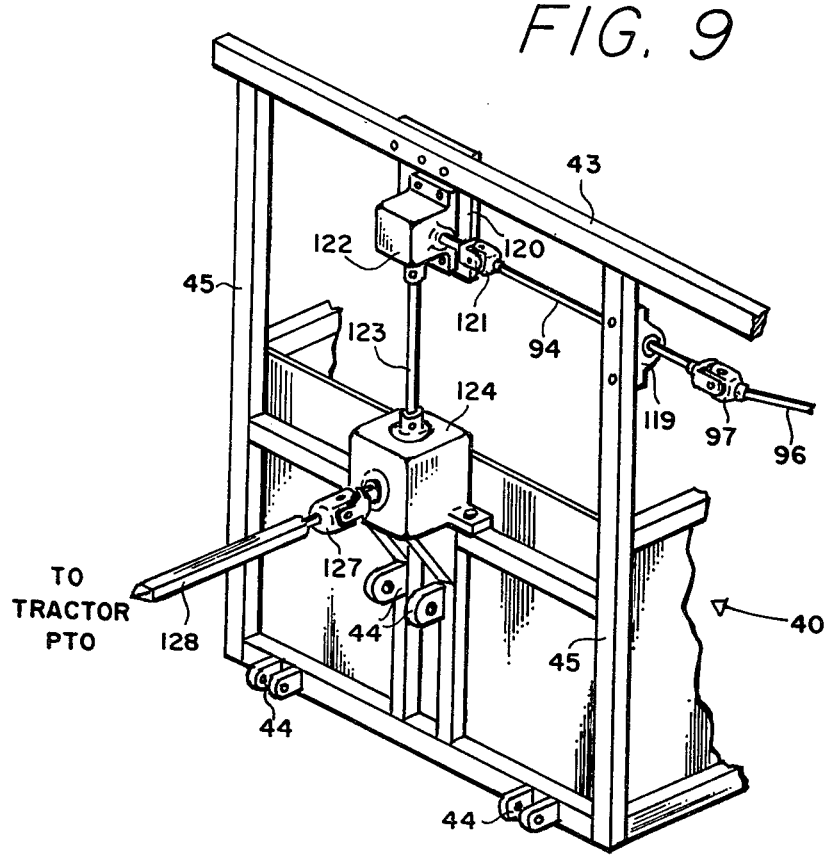
FIG. 9 is a perspective view of an alternative driving system for my agricultural stake puller utilizing a power take off on the pulling tractor.

While I prefer to provide driving power to my stake puller as described above, in some applications, it is desirable to utilize a power take-off (PTO) from the pulling tractor. FIG. 9 shows a partial perspective view of bin assembly 40 adapted to provide a PTO drive. Coupler 128 connects to the tractor PTO and drives gear box 124 via universal joint 127. The output shaft 123 of gear box 124 is connected to right angle drive 122 supported from cantilevered arm 43 by bracket 120. Drive shaft 94, supported by pillow block 119, is connected by universal joint 121 to right angle drive 122. The gear ratios of gear box 124 are selected to synchronize the rearward movement of puller chains 32 with the forward movement of the pulling tractor to assure only a vertical component of pulling force on the stakes.

Although I have shown a particular size and configuration of bin 51, almost any desired capacity bin may be used with my invention. In the type of bin shown in FIG. 1, for example, the stakes from a number of rows may be collected, and the rear door 57, hingedly attached at the bottom, may then be swung down at the end of a row, the stakes dumped, and stacked for subsequent pick-up by a truck or the like. Alternatively, a large four-wheel trailer type bin may be utilized with provisions for a worker to the bundling stakes as the pulling process takes place. Thus, a large field may be covered in one operation. Many other variations in this aspect of my invention will be obvious to those of skill in the art. I have shown a preferred embodiment hereinabove; however, many other arrangements and modifications to the disclosed structure may be made without departing from the spirit and scope of my invention.

I claim:

1. Apparatus for pulling and collecting agricultural stakes and the like from rows of crop beds or the like comprising:
   a first supporting framework;
   two endless chain conveyors arranged side by side and supported by said first framework, said conveyors inclined upwardly in a front to rear direction and adapted to operate in concert to grip said stakes, to apply a vertical pull thereto and to carry said stakes rearwardly and upwardly;
   a collection bin having wheels for moving along a row containing stakes to be pulled, said bin adapted to hold pulled stakes;
   a second supporting framework attached to said bin for pivotally supporting said first framework;
   stake transport means disposed to receive said pulled stakes from said conveyors and adapted to transport said pulled stakes to said bin for deposit therein; and
   burner means disposed forward of said first framework for removing lines from said stakes prior to pulling.

2. The apparatus as defined in claim 1 which further comprises drive train means operatively connected to said wheels, said conveyors and said stake transport means, said drive train means operated by forward movement of said bin for the moving of the chains of said conveyors at a linear velocity equal to the forward speed of movement of said bin.

3. The apparatus as defined in claim 1 which further comprises drive train means operatively connected to said conveyors and said stake transport means, said drive train means adapted to connect to and receive power from a vehicle pulling said apparatus.

4. The apparatus as defined in claim 2 or 3 in which said collection bin is adapted to be pulled by a tractor type vehicle.

5. The apparatus as defined in claim 4 which further comprises a third supporting framework for adjustably supporting the forward end of said first supporting framework, said third framework attached to said vehicle, whereby a distance between the forward end of said two chain conveyors and the surface of a crop bed may be selected.

6. The apparatus as defined in claim 5 in which:
    said collection bin is moved along one row and said second and third supporting frameworks support said first framework over an adjacent row;
    said chain conveyors are aligned longitudinally with the row of said stakes to be pulled; and
    said stake transport means is disposed laterally with respect to said conveyors.

7. The apparatus as defined in claim 6 in which said two endless chain conveyors comprise:
    a pair of endless chains;
    a pair of contiguous chain conveyor idler sprockets disposed at the front of said first framework and supporting the forward portions of said endless chains;
    a pair of contiguous chain conveyor drive sprockets disposed at the rear of said first framework and supporting the rearward portions of said endless chains, said sprockets operatively connected to said drive train means and adapted to rotate in opposite directions thereby driving the inner runs of said pair of endless chains to move in a rearward direction; and
    a pair of parallel chain guide plates disposed longitudinally between said pair of front sprockets and said pair of rear sprockets and arranged to maintain said inner runs of said two endless chains in an essentially parallel, side-by-side position along a longitudinal line between said pairs of front and rear sprockets.

8. The apparatus as defined in claim 7 in which:
    said first supporting framework includes a movable element thereof for supporting the front and rear sprockets of one of said chain conveyors, said movable element spring biased to normally maintain one pair of said front and rear sprockets in contact with the other respective pair of front and rear sprockets and to move apart when a stake is moved between said pair of front sprockets or between said pair of rear sprockets; and
    one of said chain guide plates is spring biased to normally maintain said inner runs of said endless chains of said chain conveyors in contact with each other and allow said inner runs to move apart when a stake is gripped between said inner runs of said endless chains, said spring bias causing said chains to securely grip said stake.

9. The apparatus as defined in claim 8 in which said spring biased chain guide plate comprises a multiplicity of segmented sections thereof in which each of said segmented sections is individually spring biased for permitting said inner runs of said chain to securely grip stakes of varying thicknesses when said stakes are spaced along said inner runs of said pairs of endless chains.

10. Apparatus for pulling and collecting agricultural stakes and the like from rows of crop beds or the like comprising:
    a first supporting framework;
    two endless chain conveyors arranged side by side and supported by said first framework, said conveyors inclined upwardly in a front to rear direction and adapted to operate in concert to grip said stakes, to apply a vertical pull thereto and to carry said stakes rearwardly and upwardly;
    a collection bin having wheels for moving along a row containing stakes to be pulled, said bin adapted to hold pulled stakes;
    a second supporting framework attached to said bin for pivotally supporting said first framework; and
    stake transport means disposed to receive said pulled stakes from said conveyors and adapted to transport said pulled stakes to said bin for deposit therein, said stake transport means including an endless conveyor belt supported by a drive pulley, said pulley disposed at the rear of said chain conveyors, and by a second pulley disposed above said bin, said drive pulley driven by external drive means, stake contacting projections along said endless conveyor belt, and stake guide bars, including spring loaded guide bars for holding stakes firmly in contact with said belt whereby said projections cooperate to move stakes along said guide bars to said collecting bin.

11. The apparatus as defined in claim 10 in which said guide bars include guide bars attached to said collecting bin for contacting the lower ends of said stakes as said stakes are transported to said bin to cause each of said stakes to move toward a horizontal position for depositing in said bin.

12. Apparatus for pulling and collecting agricultural stakes and the like from rows of crop beds or the like comprising:
    a first supporting framework;
    two endless chain conveyors arranged side by side and supported by said first framework, said conveyors inclined upwardly in a front to rear direction and adapted to operate in concert to grip said stakes, to apply a vertical pull thereto and to carry said stakes rearwardly and upwardly;
    a pair of contiguous chain conveyor drive sprockets disposed at the rear of said first framework and supporting the rearward portions of said endless chain conveyors, said sprockets operatively connected to an external drive means and adapted to rotate in opposite directions thereby driving the inner runs of said pair of endless chain conveyors to move in a rearward direction;
    a collection bin having wheels for moving along a row containing stakes to be pulled, said bin adapted to hold pulled stakes;
    a second supporting framework attached to said bin for pivotally supporting said first framework;
    a first pair of vertically spaced apart drive pulleys, said pulleys having a common vertical drive shaft, said drive shaft supported at the rear of said chain conveyors and driven by said external drive means;
    a second pair of vertically spaced apart idler pulleys having a common vertical shaft and disposed above said bin;
    a pair of essentially parallel endless conveyor belts supported by said first and second pairs of pulleys and disposed to receive said pulled stakes from said conveyors and adapted to transport said pulled stakes to said bin for deposit therein;
    first stake guide bars, including spring loaded guide bars for holding a stake firmly in contact with one of said endless chains as said one endless chain carries said stake around the one of said rear drive sprockets supporting said one endless chain; and spring loaded stake guide bar disposed essentially parallel with said pair of conveyor belts and essentially centered between said pair of conveyor belts for holding a stake firmly against said belts, said belts carrying said stake from said rear drive sprocket along said guide bar to said collecting bin.

13. The apparatus as defined in claim 12 in which the lower one of said pair of conveyor belts includes stake contacting projections along the outer surface thereof.

14. The apparatus as defined in claim 13 which further comprises guide bars attached to said collecting bin for contacting the lower ends of said stakes as said stakes are transported to said bin to cause each of said stakes to move toward a horizontal position for depositing in said bin.

15. An agricultural stake puller for pulling and collecting agricultural stakes and the like from rows of crop beds or the like, said stake puller adapted to be towed by a vehicle along one row, and to grasp and pull stakes vertically from an adjacent row, comprising:
- a collection bin having wheels for towing over one row of said beds, said bin adapted to receive and hold pulled stakes;
- a first supporting framework attached to said collection bin and having a cantilevered arm projecting over an adjacent row;
- an elongate frame pivotally attached at its rear portion to said cantilevered arm so as to support said frame over said adjacent row longitudinally parallel with a center line of said row;
- a second supporting framework attachable to said towing vehicle and attached to the front portion of said elongate frame for supporting said frame in a direction inclined upwardly from the front to the rear of said frame;
- a pair of parallel-mounted endless chain conveyor means having a pair of front sprockets mounted at the front of said frame and a pair of rear driving sprockets mounted at the rear of said frame, a right endless chain mounted on the right front one of said pair of front sprockets and on the right rear one of said pair of rear driving sprockets, a left endless chain mounted on the left front one of said pair of front sprockets and on the left rear one of said pair of rear driving sprockets, said chain conveyor means adapted to have the inner runs of said right and left endless chains essentially parallel and in mutual contact, said endless chains for gripping stakes between said inner runs of said endless chains, for pulling said stakes out of said bed, and for conveying said stakes to the rear of said frame as said stake puller is towed along said row;
- drive train means adapted to drive said pair of driving sprockets of said endless chain means in opposite directions of rotation and at a rate and direction such that said stake-gripping parallel chains move rearwardly at a speed equal to the forward speed of movement of said bin;
- endless stake transport belt means disposed at the rear of said frame, said belt means having stake-engaging cleats projecting along operative surfaces thereof and driven by pulley means operatively connected to said drive train means, said stake transport belt adapted to receive a pulled stake from the rear of said endless chain conveyor means and to transport and deposit said pulled stake in said bin;
- stake guide bars associated with said stake transport belt means and having spring means for holding a stake firmly between said belt means and said guide bars, said guide bars serving to guide pulled stakes into said bin; and
- burner means disposed forward of said elongate frame for removing lines from said stakes prior to pulling;
- whereby movement of said bin along said row causes said burner means to clear strings from stakes ahead of said endless chain means, such cleared stakes to then be grasped by said pair of front sprockets and carried rearwardly to be gripped between said parallel chains, said chains then conveying such stakes to the rear of said frame and simultaneously pulling such stakes with a vertical force only out of and clear of said bed, such pulled stakes being received from said parallel chains, transported to said bin and deposited therein by said stake transport belt means.

16. The stake puller as defined in claim 15 in which said drive means is connected to said wheels of said bin for obtaining power from towing of said stake puller by said vehicle.

17. The stake puller as defined in claim 15 in which said drive means is adapted to be connected to a power take-off source from said towing vehicle.

* * * * *